Jan. 6, 1925.
J. P. ELSTER
1,522,002
VEGETABLE SLICER
Filed Feb. 5, 1924
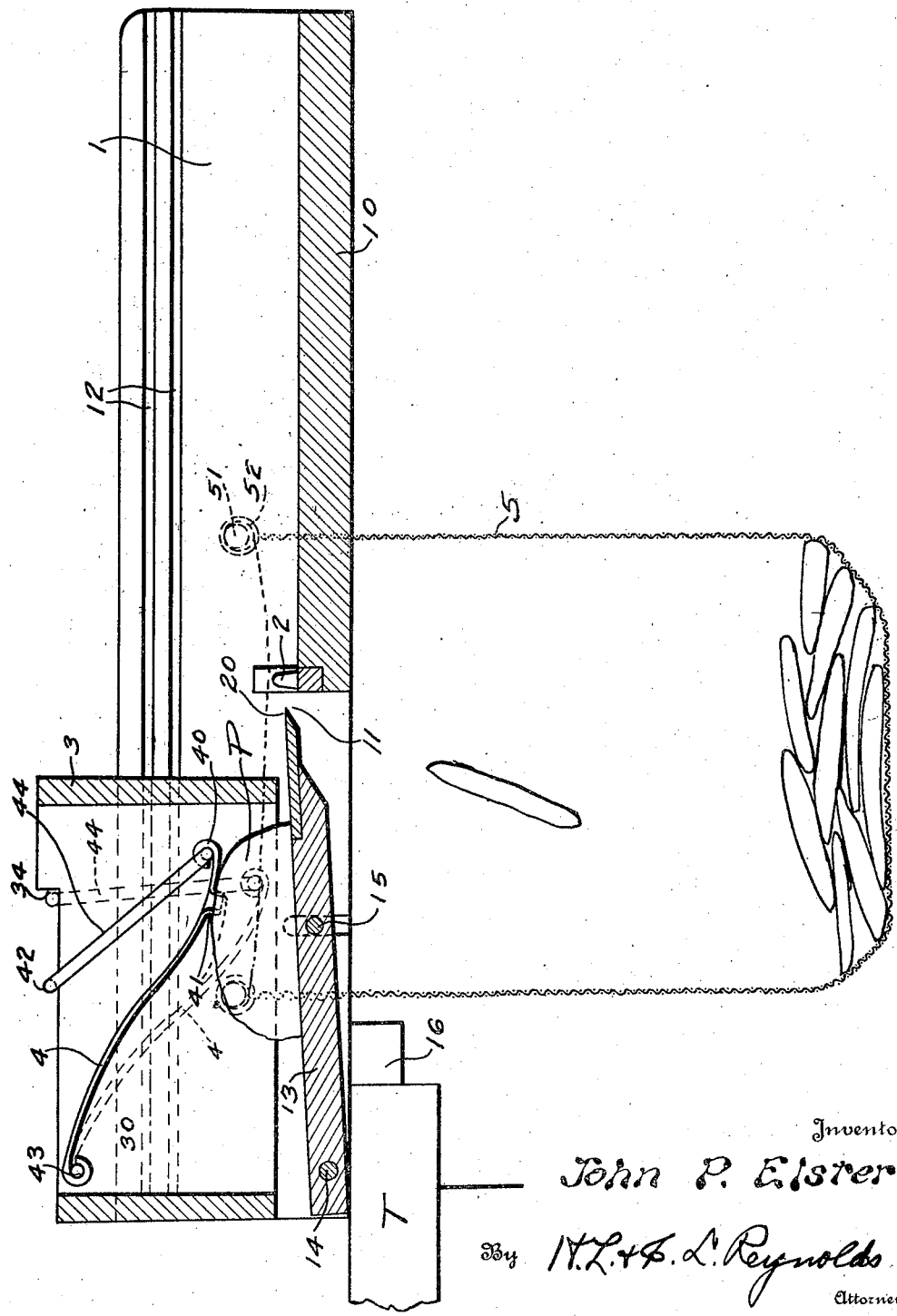
Inventor
John P. Elster
By W.L.+H.L. Reynolds
Attorneys Patented Jan. 6, 1925.

1,522,002

UNITED STATES PATENT OFFICE.

JOHN P. ELSTER, OF BREMERTON, WASHINGTON.

VEGETABLE SLICER.

Application filed February 5, 1924. Serial No. 690,708.

*To all whom it may concern:*

Be it known that I, JOHN P. ELSTER, a citizen of the United States of America, and resident of the city of Bremerton, in the county of Kitsap and State of Washington, have invented certain new and useful Improvements in Vegetable Slicers, of which the following is a specification.

My invention relates to a device for slicing vegetables, for example potatoes, into various forms. By proper choice of knives and by proper adjustment thereof the device may be made to cut shoe string potatoes, potatoes for French frying, potato chips, and the like.

It is an object of my invention to provide such a slicer which is convenient and cheap to make and in which the vegetable may be firmly held and moved back and forth across the knives, and in which the vegetable may be pressed firmly against the knives without danger that the operator's fingers may be cut thereby.

A further object is the provision of means for use in connection with such vegetable slicers, which will serve to catch the slices as they are made and which may be conveniently attached to and detached from the machine.

My invention comprises those novel parts and combinations thereof which are shown in the accompanying drawings, described in the specification, and particularly defined by the claims terminating the same.

The accompanying drawing shows a longitudinal section through my present preferred form of the invention.

The slicer is in the form of a trough having the side walls 1 and the bottom 10 and open at both ends, and having a transverse slot 11 in the bottom, adjacent which are positioned knives 2 and 20, the knives extending transversely across the trough. A frame 3, open at top and bottom, is guided for motion longitudinally of the trough, as by means of suitable followers (not shown) on the frame 3, slidable in longitudinal grooves 12 in the side walls 1 of the trough. The knives 2 are vertical and may be spaced as desired or may be omitted entirely. The knife 20 is vertically adjustable, for example by securing it to a bottom section 13 pivoted to the side walls at 14 and adjustably held in position by a pin and slot connection, indicated at 15. Such a construction broadly is old, and the details thereof may be varied as may be desired.

The frame 3 has a follower 4 pivoted therein, preferably at 43 adjacent the upper rear edge of the frame and extending transversely thereof. The follower 4 thus may be swung from the frame to permit the insertion of a vegetable therein, and then may follow the vegetable downward into the frame to press it against the bottom 10 of the trough, and past the knives 2 and 20. For engaging the vegetable and to prevent slippage thereof relative to the frame 3, the follower is provided with prongs or the like, indicated as inward extensions 41 formed by pressing inward the edges of a hole or holes formed in the follower, these members 41 projecting inwardly or toward the vegetable indicated at P.

I provide means which will prevent the follower dropping below a position or plane where it is clear of the knives 2 and 20, but close thereto. This is conveniently done by providing a pair of links 44 pivoted in the swinging edge 40 of the follower and having laterally extending fingers 42 bent outwardly from the free ends of these links to engage over the upper edge of each side wall 30 of the frame. These links 44 may conveniently be formed as the legs of a U-shaped member, the transverse bar of which is pivoted in the rolled over edge 40 of the follower 4. The fingers 42 normally ride along the upper edge of the side walls 30, and may be stopped thereby when substantially vertical, but in order to insure stopping definitely when the swinging edge 40 of the follower has reached the lowest position it is desired it should assume, the shoulders 34 are positioned in the upper edges of the walls 30 to engage these fingers 42, thus to prevent further forward movement of the fingers and further downward movement of the follower.

The device is operated by inserting a vegetable after the follower is swung down upon the vegetable, the prongs 41 engaging in the vegetable. The frame 3 is then moved forward and rearward to carry the vegetable past the knives 2 and 20. At each rearward movement of the frame and vegetable, a slice or slices are cut from the vegetable. The device may conveniently be held with its rear edge supported upon a table T and with pins 16 depending from its side walls 1 to engage the edge of the table.

In order to catch and hold the slices of vegetable as they pass through the transverse slot 11, I prefer that a receptacle be suspended from this device beneath this slot. I have, therefore, provided pins 51, a pair of which project laterally from each side wall 1 at the outside thereof and which are intended to receive rings 52 secured in a receptacle such as the bag 5. Each pair of pins 51 is disposed one at each side of the slot 11, so that the receptacle 5 is positioned beneath this slot and closely beneath the bottom 10 of the slicer. The slices are thus caught and retained until the operation is finished, when the bag is removed and the slices taken therefrom.

What I claim as my invention is:

1. In a vegetable slicer, in combination, a trough, a frame guided for movement longitudinally thereof, the bottom of said trough having a slot thereacross, slicing knives adjacent said slot, a follower pivoted by an edge at an upper edge of said frame, to swing therefrom and thereinto, links pivoted to the swinging edge of said follower, and fingers upon the free ends of said links extending over the upper edge of said frame, said fingers being engageable with said upper edge of the frame, and said links being of a length, to stop downward movement of said follower at a position above said knives when the fingers are engaged with the frame edge in limiting position.

2. In a vegetable slicer, in combination, a trough, a frame open at top and bottom and guided for movement longitudinally thereof, the bottom of said trough having a slot thereacross, slicing knives adjacent said slot, a follower pivoted by its rear edge to the upper rear edge of said frame to swing therefrom and thereinto, rearwardly-facing stop shoulders adjacent the forward end of the upper side edges of said frame, a pair of links pivoted to opposite sides of the swinging front edge of the follower, and fingers extending laterally from the swinging ends of said links over the upper side edges of the frame, and engageable with said shoulders, said links being of a length to limit downward movement of the front edge of the follower, when the fingers and shoulders are engaged, to a position above the knives.

Signed at Bremerton, Kitsap County, Washington, this 25th day of January, 1924.

JOHN P. ELSTER.